United States Patent

[11] 3,565,082

| [72] | Inventor | Glenn Dale Head<br>Des Moines, Iowa |
|---|---|---|
| [21] | Appl. No. | 740,324 |
| [22] | Filed | June 26, 1968 |
| [45] | Patented | Feb. 23, 1971 |
| [73] | Assignee | Deere & Company<br>Moline, Ill. |

[54] CORN-HUSKING MECHANISM
3 Claims, 2 Drawing Figs.

[52] U.S. Cl. .................................................. 130/5
[51] Int. Cl. ............................................... A01d 45/02
[50] Field of Search ........................................ 130/5 (A), 5 (G), 5 (B); 56/18

[56] References Cited
UNITED STATES PATENTS

| 2,546,264 | 3/1951 | Jones ........................... | 130/5 |
| 3,366,120 | 1/1968 | Gunyou et al. ............... | 130/5 |
| 892,208 | 6/1908 | Baird ........................... | 56/18 |

*Primary Examiner*—Antonio F. Guida
*Attorneys*—H. Vincent Harsha, Harold M. Knoth, William A. Murray and John M. Nolan ABSTRACT: A corn-husking mechanism composed of a plurality of parallel husking rolls disposed in side-by-side relation and driven so that adjacent sides of the rolls move downwardly and engage the husks on loose ears of corn moving along the surface of the rolls. There is provided a rotary driven brush device in which the bristles of the brushes gently contact the surface of the ears and hold them against the husking rolls.

PATENTED FEB23 1971          3,565,082

INVENTOR.
GLENN D. HEAD

BY William A Murray

ATTORNEY 3,565,082

1

CORN-HUSKING MECHANISM

BACKGROUND OF THE INVENTION

This invention relates to an ear control device for use in combination with an ear-husking bed which operates to remove silt and husks from ears of corn. Still more particularly, the invention relates to a rotary device above a husking bed that is composed of bristle-type brushes that contact the upper sides of the ears on the husking bed and gently bear against the ears so that maximum efficiency of husking may occur.

It has heretofore been known to provide rotary devices above a husking bed that engage the ears of corn as they move around the husking rolls in order to position and apply pressure against the ears of corn. Such a device is shown, for example, in U.S. Pat. No. 2,828,749 which issued to W. E. Slavens et al. 1 Apr. 1958. In this patent there is shown a rotary device having rubber-type flexible fingers or arms that are positioned above the nips between adjacent rolls and which engage the upper sides of the ears of corn and press them into the husking rolls. The flexible fingers or pressure arms shown in the patent have notches in their outer ends that are designed to fit about the upper sides of the ears as they move along the husking rolls. When the ears are properly positioned in the nips of the husking rolls, the above type of flexible arm operates to its maximum efficiency.

The problem that exists in the aforementioned type of husking unit is that the rotary devices and particularly the flexible arms do not operate efficiently when ears are not properly positioned in relation to the husking rolls. Ears are normally transmitted to the husking bed in haphazard manner so that the ears may often times lie transverse to the lengthwise dimension of the rolls. When such occurs, the shape of the flexible fingers or arms have little effect upon husking of the ears. In the Slavens patent, therefore, there are provided other means of straightening the ears on the husking bed.

SUMMARY OF THE INVENTION

With the above in mind, it is the primary object of the present invention to provide an ear-positioning device of a rotary nature that is positioned above the rolls of the husking bed. The device is composed of radially extending bristle-type brushes that are axially spaced along the shaft means of the device. The ends of the bristles will contact the ears of corn as they move along the husking bed. The individual bristles, being flexible, will permit the brush to shape itself to fit the contour of the ear as it moves along the husking rolls. The nature of the husking rolls and the rotation of the brushes will tend to self-align or straighten the ears of corn on the husking bed. By the bristles applying a gentle force against the ears of corn, proper alignment of those ears on the husking rolls will occur quickly. Also, since the ends of the bristles will form to the shape or contour of the ears of corn, even though an ear is not positioned in the nip, there will exist substantially the same pressure on the ear that would occur if it were properly aligned.

It is a further object of the invention to provide a husking bed in which the rolls are disposed in sets of four with the inner rolls being at a level beneath the outer rolls. The two inner rolls have their adjacent sides moving upwardly so as to define an ear-rejecting nip. The outer rolls cooperate with the respective inner rolls so that their adjacent sides move downwardly and define husk-removing nips. The lower ends of the bristles on the rotary device pass closely adjacent the upper surfaces of the outer rolls so that the bristles operate to prevent the ears of corn from moving from the area of the husking nips. The bristles, while holding the ears in the husking nips, will permit relative free movement vertically above the central ear-rejecting nip so that the inner rolls may operate to move the ears upwardly and outwardly toward one of the husk-removing nips.

2

DESCRIPTION OF THE PREFERRED EMBODIMENT

The husking unit may be of the type utilized in combination with a corn harvesting machine. For such a combination reference may be made to U.S. Pat. No. 2,822,811 which issued to W. E. Slavens et al. 11 Feb. 1958. The husking unit is substantially identical to that shown in the unit with the exception of the particular positioning of the husking rolls and the ear control device which herein will be described in detail.

Figure 1:
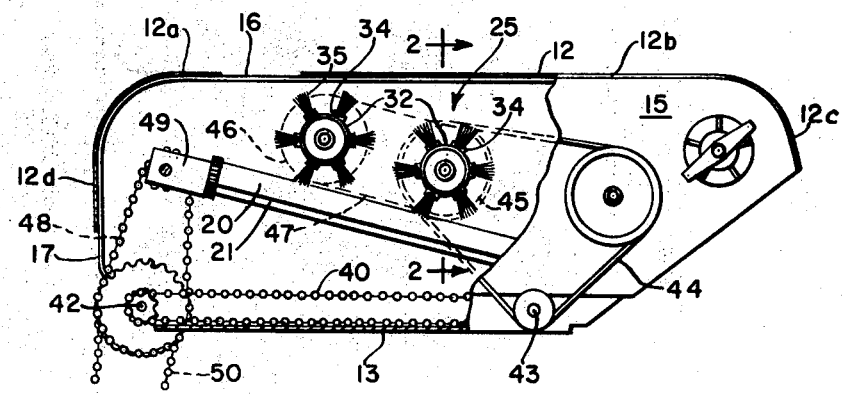
FIG. 1 is a side view of a husking unit incorporating the ear control device of the present invention. Portions of the housing are removed to show internal mechanism.

The husking unit comprises a unit housing structure having an upper panel 12 and a lower panel 13 interconnected at their opposite edges by side panels 14, 15. The upper panel 12 is divided into two portions 12a, 12b which are spaced apart to provide an ear intake opening 16 in the top of the unit housing. The portion 12b is turned downwardly as at 12c to form with the side panels 14, 15 and the lower panels 13 an ear discharge opening, not shown, but located generally in the lower right end of the husking unit as shown in FIG. 1. The upper panel 12a is turned downwardly as at 12d to form with the side panels 14, 15 and the lower panel 13 a husk discharge opening 17 at the opposite end of the husking unit from the ear discharge opening.

At the upper forward end of the husking unit is a blower, indicated in its entirety by the reference numeral 18, for blowing trash from the husking unit. Positioned internally of the unit housing are a plurality of pairs of cooperating husking rolls. The rolls of each pair are arranged so that the axes are parallel but with the rolls 20 being vertically offset above the rolls 21. As is conventional, each pair of rolls 20, 21 have adjacent sides moving downwardly so as to define a husking nip 22 in which ears of corn may ride and the husks be stripped therefrom and moved downwardly between the rolls. The rolls are normally disposed in sets of four with a pair of inner rolls 21 having their adjacent sides moving upwardly so as to define an ear-rejecting nip 24. The outer rolls 20 are vertically offset above the inner rolls 21 and cooperate with their respective inner rolls to provide the aforedescribed husking nips 22 on opposite sides of the ear-rejecting nip 24. Thus, the set of four rolls form a cradlelike area for receiving ears of corn and the two center rolls 21 will operate to reject ears falling into the nip 24 and to transfer the ears into the husking nips 22. The husking rolls 20, 21 are designed and positioned so that the husking nips 22 are of such size as to carry individual ears of corn when the length of the ear is lengthwise of the nip. As the rolls rotate, they grip portions of the husks. As the ear advances along the rolls toward the ear discharge opening, the husks are removed to leave a relatively cleanly husked ear. In a perfect situation, husking will be accomplished without shelling. However, in many instances and unless prevented from doing so, the ears will stand upright, butt end down, so that the butts are seized between the rolls causing pinching of the ears to such an extent as to cause shelling at the butt ends. This is due to the resistance to separation of the husk at the butt end when seized in the manner just described. Also, unless suitable means are provided, the ears will many times lie crosswise to the rolls, and consequently incomplete husking may result.

Figure 2:
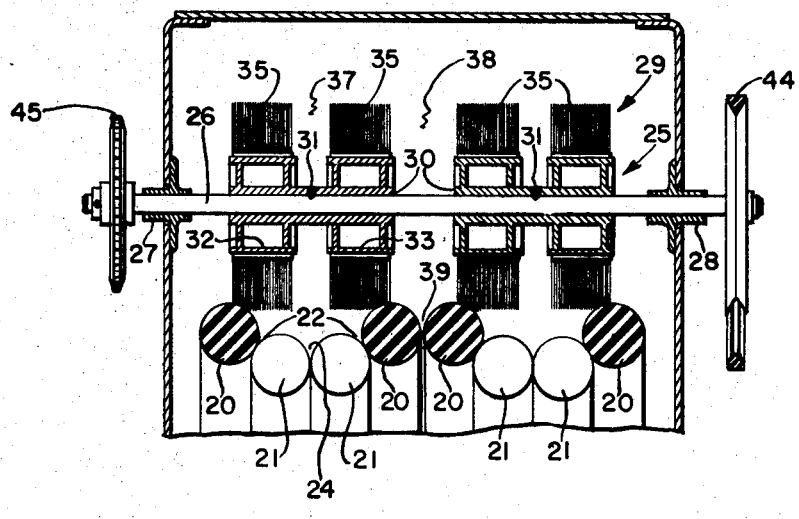
FIG. 2 is a sectional view taken substantially along the lines 2—2 of FIG. 1.

In order to prevent the latter conditions and to provide proper pressure between the ears and husking rolls 20, 21, there is provided a plurality of rotary devices, indicated in their entirely by the reference numeral 25, that are disposed above the rolls and transverse thereto. In the present instance, there are two rotary devices 25 and they are spaced lengthwise in respect to the rolls 20, 21. Each rotary device has a central or main shaft 26 journaled for rotation at 27, 28 in the respective sidewalls 14, 15. Spaced axially along the shaft 26 is a series of ear-retaining wheels 29, each of which includes a central hub portion 30 keyed at 31 to rotate with the respective shaft 26. The hub 30 carries a pair of axially spaced collars 32, 33 having pinch-type clamps 34 fixed to and angularly spaced about their outer surfaces. The clamps 34 carry radially projecting bristles 35 forming angularly spaced brushes 36. Referring to FIG. 2, the brushes 36 extend an axial length substantially greater than the diameter of a normal ear of corn. The brushes 36 are substantially centrally located relative to the nips 22 and are spaced apart to provide an axial opening 37 that is substantially above the ear-rejecting nip 24. Thus, there is provided for each set of four rolls 20, 21 a double brush rotary wheel that has the brush portions above the husking nips and the spacing 37 above the ear-rejecting nips 24. Also, it will be noted that between the two sets of rotary wheels 29, there is a relatively wide axial gap 38 that is vertically aligned with the two husking rolls 20 that form an ear-rejecting nip 39. The wheels 29 rotate in the direction of the arrows shown in FIG. 3 so as to aid the ears of corn in their movement from the upper ear-receiving end of the husking rolls to their lower discharge ends.

In operation, ears will fall onto the husking rolls under the ear intake 16 and will tend to gravitate into one or the other of the four sets of rolls. Should the ears move into the nips 22 in their lengthwise direction, the wheel brushes 29 will contact the ears and move them along the rolls. The bristles 35 of the brushes will bend or deform to the shape of the ears, and consequently there will always be pressure by the individual bristles 35 against the surface of the ear. This will insure relative uniform pressure in the husking operation. Should an ear fall into the ear-rejecting nip 24, one or the other of the inner rolls 21 will tend to move it upwardly and over the roll. As the ear moves upwardly, it comes into contact with the bristles 35 and the bristles aid in retaining it on the surface of the respective roll 21 until it is moved into the nip 22. It should also be noted that the lower ends of the bristles 35 pass closely adjacent to the upper surfaces of the outer rolls 20 thereby insuring that ears will not be permitted to move out of the nips 22 and possibly over the rolls 20. Should an ear fall crosswise on the husking rolls, the brushes 36 will tend to contact them in the crosswise direction and to turn the ears in a lengthwise direction. Thus, the direction of motion of the brushes being parallel to the axes of the rolls 20, 21 tends to straighten ears lengthwise in the nips.

In husking, the husk will normally depart from the rolls 20, 21 and move onto a husk conveyor 40. The husk conveyor 40 is of a chain conveyor type being driven by transverse drive shaft 42 at one end and is carried over an idler drive shaft 43 at its opposite end. A felt drive 44 extends from the shaft 43 to the lowermost rotary device 25. The main shaft 26 of the latter rotary device carries a sprocket 45 outward of the side panel 14 and the sprocket 45 is connected to a sprocket 46 on the uppermost rotary device 25 by means of a chain 47. The sprockets 45, 46 are of equal size and consequently the two rotary devices 25 rotate in the same direction at the same rate of rotation. The drive shaft 42 also is connected by means of a chain drive 48 to the upper ends of the husking rolls 20, 21 and are drivingly connected to the rolls through gear transmissions indicated by the reference numeral 49. Such drive is, of course, conventional in many commercial husking units. The shaft 42 is driven by a chain drive 50 which extends to the main power source of the implement.

I claim:

1. An ear control for use with a husking bed having a plurality of parallel pairs of husking rolls with the rolls of each pair being disposed in side-by-side relation to one another so as to define an upper husking nip with said rolls being driven so that adjacent sides thereof move downwardly, and with the pairs being disposed alongside one another whereby the adjacent rolls between adjacent pairs have their adjacent sides moving upwardly and define therebetween ear-rejecting nips, said ear control comprising: a plurality of rotary devices disposed above the rolls and transverse thereto and spaced lengthwise of the rolls, each of said devices comprising a central shaft means transverse to the rolls and a plurality of individual bristle-type brushes extending radially in respect to and supported on the shaft means, said brushes being spaced axially along the shaft means with each of said brushes having an axial expanse so that parts of their bristles are in vertical alignment with the husking nips and parts of their bristles are above the husking rolls forming the respective husking nips, and with the axial spacing between the brushes being in vertical alignment with the ear-rejecting nips, each of said brushes having an axial length greater than the diametrical size of a normal ear in the husking nip and being centrally located in respect to its respective husking nip whereby brush bristles in contact with ears in the nip will engage substantially the entire upper sides of the ears and means rotating the rotary devices so that the brushes move lengthwise of their respective husking nips.

2. The structure as set forth in claim 1 in which the rolls are normally in sets of four with a central ear-rejecting nip defined by two inner rolls and a pair of husking nips on opposite sides of the inner nip formed by the respective inner rolls and two outer rolls, the outer rolls being vertically offset above the inner rolls; and in which the ends of the brush bristles pass closely adjacent the upper sides of the outer rolls.

3. The structure as set forth in claim 1 further characterized by the bristle-type brushes being angularly spaced about the shaft means.